United States Patent
Ozugur et al.

(10) Patent No.: US 7,890,474 B1
(45) Date of Patent: Feb. 15, 2011

(54) PRESENCE DRIVEN COMMUNICATION CONTACTS

(75) Inventors: Timucin Ozugur, Fairview, TX (US); Christophe J. Vuillaume, Oak Park, CA (US); Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 238 days.

(21) Appl. No.: 11/382,360

(22) Filed: May 9, 2006

(51) Int. Cl.
*G06F 17/30* (2006.01)

(52) U.S. Cl. .................. 707/689; 707/706; 707/769; 707/770

(58) Field of Classification Search .............. 707/3, 707/10, 805
See application file for complete search history.

(56) References Cited

U.S. PATENT DOCUMENTS

| 5,768,347 | A | * | 6/1998 | Beyda | 379/67.1 |
| 5,860,067 | A | * | 1/1999 | Onda et al. | 705/9 |
| 2005/0169617 | A1 | * | 8/2005 | Portmann | 396/4 |
| 2006/0150032 | A1 | * | 7/2006 | Furukawa et al. | 714/47 |
| 2007/0041548 | A1 | * | 2/2007 | Ordille et al. | 379/202.01 |

* cited by examiner

*Primary Examiner*—Baoquoc To
(74) *Attorney, Agent, or Firm*—RG & Associates

(57) ABSTRACT

A system, method and computer readable medium for presence driven communication contacts of presentities in a presence server in a presence system comprises searching a relational directory for a sought individual, scanning the relational directory for at least one individual associated with the sought individual, determining a presence state of the sought individual, and discovering a presence state of the associated individual if the sought individual is unavailable.

14 Claims, 5 Drawing Sheets

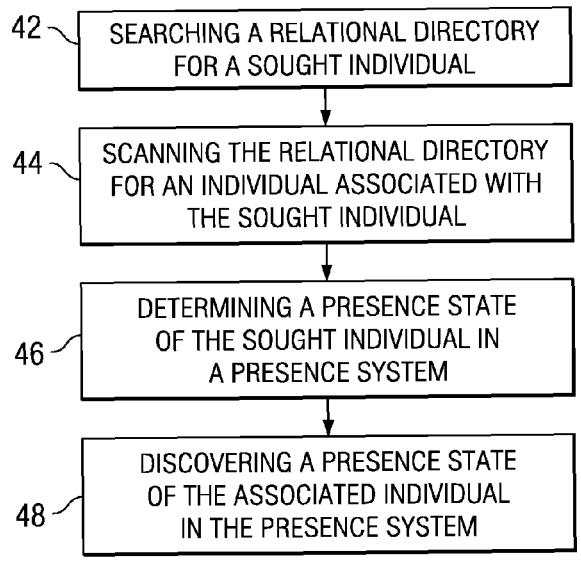
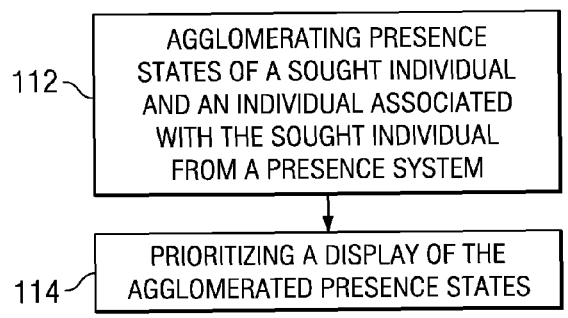

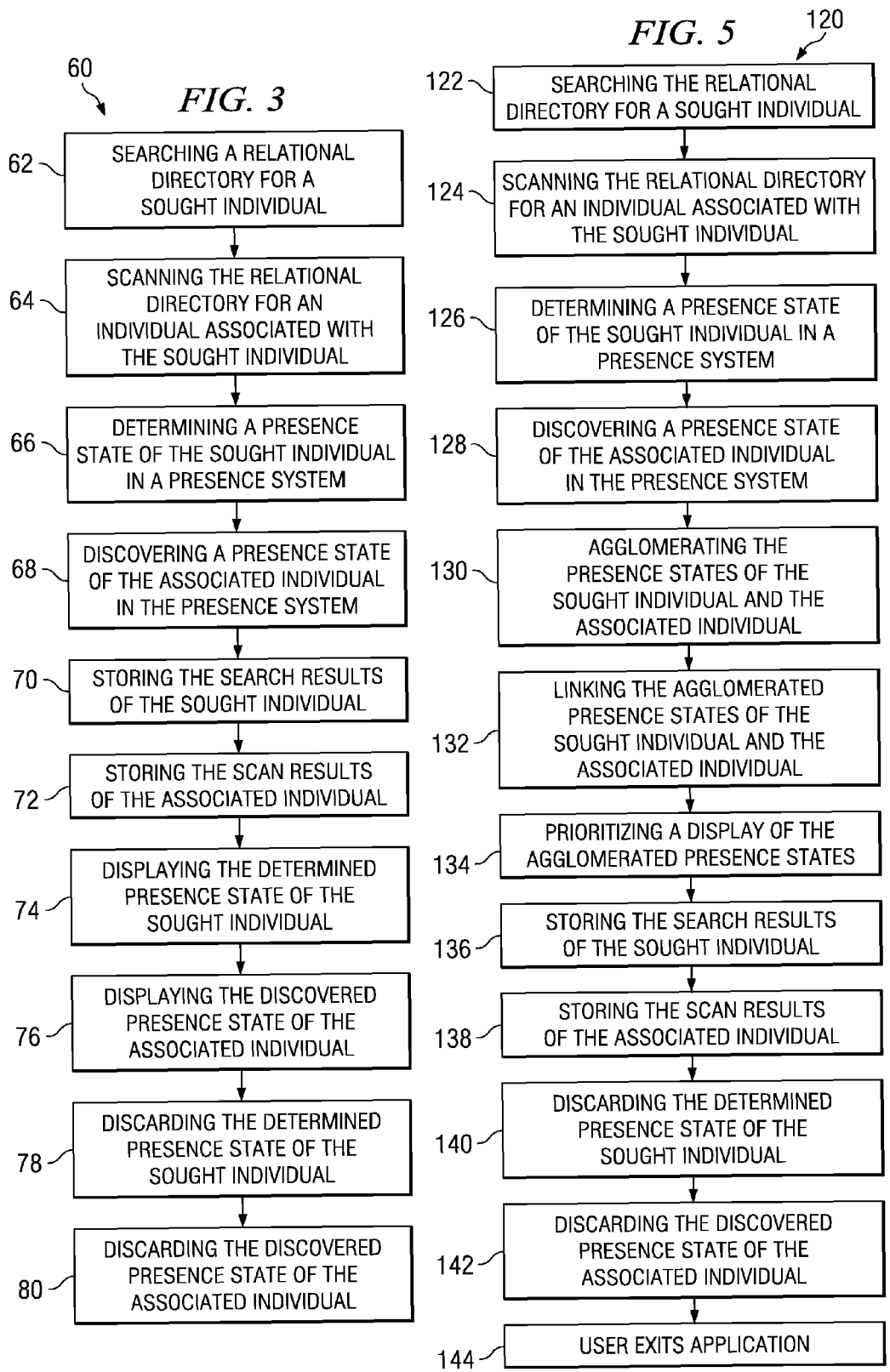

PRESENCE DRIVEN COMMUNICATION CONTACTS

BACKGROUND OF THE INVENTION

Presence is generally defined as knowing that a person is available via, for example, a certain device over a particular medium as soon as the user connects to a network. For instance, via presence information, it may be ascertained that the person is available online, and on a connected device with a certain device profile. Presence may be used to communicate the state information of a single person or a group of people or an individual entity or a group of entities. A user or entity which indicates its presence state is termed a presentity. A group of users or a group of entities which indicates a single aggregated presence state is termed as an aggregate or an aggregate presentity. For example, Human Resources (HR) group can be an aggregate presentity where the aggregate presence state can be calculated by applying some rules. The resulting aggregate presence state can be, but not limited to, "all free since 2 pm", "all busy since 4:10 pm", "at least one free since 3 pm", etc. Presence is used to notify watchers in a contact list about the state of a user or a group of users, including availability, based on the filtering rules and preferences. When the user changes its presence state, each contact on the contact list is informed about the new presence state of the user based on the filtering rules and preferences. Therefore, each contact may see different presence state of presentity due to the fact that a different filtering rule and presence may apply for each contact.

Presence provides the availability of the receiver to the user who would initiate communication with the receiver prior to establishing the communication. If the user who is receiver is not available, currently voice communication may be directed to a voicemail.

Therefore, what is needed is a system, method, and computer readable medium for utilizing presence to enable presence driven communication contacts for the intended receiver when the presence state of the intended receiver shows as unavailable. More specifically, what is needed is a system, method, and computer readable medium for automatically determining the presence states of a sought individual and an individual associated with the sought individual when the presence state of the sought individual shows unavailable to accept the communication.

Further, the present invention is related to automatically obtaining and displaying presence states of a manager of the sought individual, a colleague of the sought individual, an assistant of the sought individual, a direct report of the sought individual, or any other person associated with the sought individual, in order to enable presence driven communication contacts and display them to the user who is willing to initiate the communication with the sought individual during the communication initiation when the sought individual is unavailable.

SUMMARY OF THE INVENTION

One of the well known Private Branch Exchange (PBX) features is "call by name." In a large enterprise, when a user wants to contact a person who has an unknown phone number, the user may type the name of the person he would like to contact on his phone. The PBX typically allows for the display of all of the people in the enterprise with a matching name or a permutation of the matching name, which is obtained via relational directory access. Then, the user may call the person by 'clicking' on a 'button' on the user's display or otherwise access the matching name without having to physically dial the number. If the sought individual does not answer the call, the call is directed to voicemail.

Recently the PBX feature "call by name" has been enhanced with presence, which is called "communicate by name." When the user is searching a name, the resulting output not only displays the matching names but also their presence states obtained via accessing a presence server. Therefore, the user can ascertain whether the person whom he/she wants to contact is available and the type of media available to contact the person with. If the person is not available via any media, such as voice, instant messaging, etc., the options to contacting the user are typically limited to leaving a voicemail or to sending an email. The present invention solves this problem by providing more effective communications options when the person whom the user is trying to contact is not available.

Previously, the user could use the presence feature "communicate by skills" when the first person whom he is trying to contact was not available or the user could search for other people manually. This manual searching method provided a low efficiency of communication. The goal of presence-enabled communications is to make communication more effective. Therefore, what is needed is an ability to enlarge presence from a single individual to associates of the sought individual for communication according to the presence state of the sought individual.

The present invention increases communication efficiency in the event a user attempting to contact a person via presence-enabled communicate by name is notified that the person is unavailable. In this case, the present invention extends the results of the search. When the person is not available, the search result automatically includes the presence information of the colleague(s), direct report(s), assistant and/or manager(s), peers, group members, designated alternate or individual similarly skilled to the person sought. In other embodiments of the present invention, other individuals associated with the person sought may be included. These individuals may be provided via accessing a relational directory or may be inferred based on previous contact by the person sought and these individuals via a number of communication methods such as phone calls, emails, voice mails, blogs, and the like. As such, the present invention empowers the user to contact a colleague or direct report, for example, of the person whom is unavailable without expending additional effort.

The present invention allows the user to communicate with other contacts when the person sought is unavailable thus making communication more effective and efficient. For example, even though the person may not be available, his/her group members, his/her assistant his/her manager or the people who report to him/her may be available to answer questions. The present invention further decreases the actions the user may need to take, such as 'clicking' on a 'button' to search other people manually and on a one-by-one basis, before communication can occur.

The present invention is applicable in scenarios such as Customer Relationship Management (CRM). For instance, when a customer agent is searching for an expert, the customer agent may use the present invention to enlarge the set of people who are associated with the expert, who may be experts themselves that may be able answer a question. The present invention is applicable to Information Technology (IT), helpdesk or Human Resources (HR) personnel, when a knowledge worker is trying to reach a person whom he/she has spoken to before. For example, the worker may reach the colleagues of the person who is not available at the time.

The advantages of the present invention include enabling a high probability of successful communication, increasing the efficiency of communication and increasing workplace productivity.

In one embodiment of the invention a method for presence driven communication contacts of presentities in a presence server in a presence system comprises searching a relational directory for a sought individual, scanning the relational directory for at least one individual associated with the sought individual, determining a presence state of the sought individual, and discovering a presence state of the associated individual if the sought individual is unavailable. The method may also comprise storing the search results of the sought individual, storing the scan results of the associated individual, displaying the determined presence state of the sought individual, displaying the discovered presence state of the associated individual if the sought individual is unavailable, discarding the determined presence state of the sought individual, and discarding the discovered presence state of the associated individual if the sought individual is unavailable. The relational directory may be based upon hierarchical relationships, functional relationships, similarity of skills or predetermined groupings.

In another embodiment of the invention a computer readable medium comprises instructions for, gathering from a relational directory in a presence server in a presence system the presence states of at least one of, a sought individual and an individual associated with the sought individual, and prioritizing a display of the gathered presence states. The instructions may also comprise linking the gathered presence states of at least one of, the sought individual and the associated individual, searching the relational directory for at least one of, the sought individual and the associated individual, determining at least one of, the presence state of the sought individual and the presence state of the associated individual if the sought individual is unavailable, storing at least one of, the determined presence state of the sought individual and the determined presence state of the associated individual if the sought individual is unavailable and discarding at least one of, the stored presence state of the sought individual and the stored presence state of the associated individual.

In yet a further embodiment of the invention a system for presence driven communication contacts in a presence system, comprises a memory receives at least one of, a presence state of a sought individual, a presence state of an individual associated with the sought individual, and a processor communicably coupled to the memory, the processor, agglomerates the presence states of the sought individual and the presence state of the associated individual, prioritizes a display of the agglomerated presence states, and links the agglomerated presence states of the sought individual and the presence state of the associated individual. Wherein the processor displays the agglomerated presence states, the memory stores the agglomerated presence states and the processor discards the agglomerated presence states.

In yet another embodiment, the system may consist of a presence server or pool of servers, in which the users store their presence states, further allowing users to subscribe to other users' presence states in order to observe them in a continuous basis or in a one-shot basis.

In further still another embodiment, the system may consist of a relational directory, in which user profiles and information are stored; further each entry in the relational directory is attached or pointing to one or more entries in the relational directory due to specific relations between given entries.

BRIEF DESCRIPTION OF THE DRAWINGS

FIG. 2 depicts a second flow chart of presence driven communication contacts in accordance with a preferred embodiment of the present invention;

FIG. 3 depicts a third flow chart of presence driven communication contacts in accordance with a preferred embodiment of the present invention;

FIG. 4 depicts a first software flow chart of presence driven communication contacts in accordance with a preferred embodiment of the present invention;

FIG. 5 depicts a second software flow chart of presence driven communication contacts in accordance with a preferred embodiment of the present invention;

DETAILED DESCRIPTION OF THE INVENTION

Figure 1:
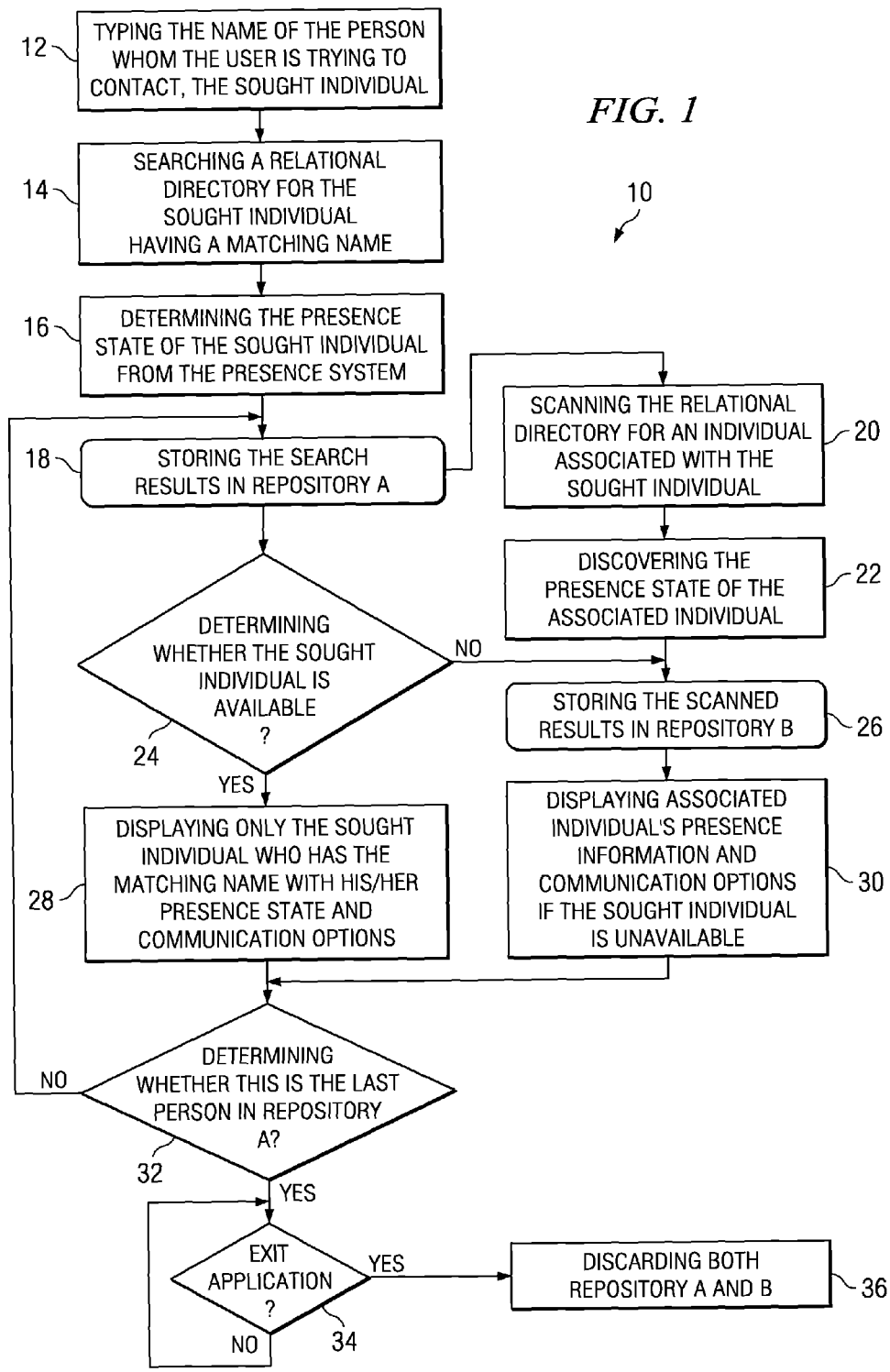
FIG. 1 depicts a first flow chart of presence driven communication contacts in accordance with a preferred embodiment of the present invention.

Referring now to FIG. 1, a first flow chart of a method of presence driven communication contacts 10 is shown. The method comprises a user typing, otherwise entering, 12 the name of the person whom the user is trying to contact, termed the sought individual. This typing can occur on any electronic device such as an Internet Protocol (IP) enabled device such as a cellular phone or computer. The corporate relational directory is searched 14 for people having a name matching, or close to matching, the sought individual. The system obtains 16 the presence state of the sought individual from the presence server. The search results of the sought individual are stored 18 in repository A. The corporate relational directory is then scanned 20 for at least one individual associated with the sought individual. The system obtains 22 the presence state of the associated individual. A determination 24 is made as to the availability of the sought individual. If the sought individual is not available, the scanned results are stored 26 in repository B. Repository A and B can be memory on either a presence server or on the user's IP device. Further, the results can be stored on one repository or on more than two repositories. Also, the determination can be performed by the presence system and/or the user's device. If the individual sought is available, then the results of repository A are displayed 28 which include the sought individual's presence state and communication options. If the sought individual is not available, then associated individual presence information and communication options are displayed 30 if the sought individual is unavailable. After a determination 32 has been made that the last available individual has been displayed from repository A, then the system requests 34 "Whether user exits the application?", then both repositories are discarded 36. The steps performed in this figure are performed by software, hardware, firmware, and/or the combination of software, hardware, and/or firmware. The transfer of information between the user and the presence system providing such a method occurs via at least one of a wireless protocol, a wired protocol and/or a combination of the wireless protocol and the wired protocol.

Referring now to FIG. 2, a second flow chart of the method of presence driven communication contacts 40 is shown. In the second flow chart, the method comprises searching 42 a relational directory for a sought individual, then scanning 44 the relational directory for an individual associated with the sought individual. A determination 46 is made of a presence state of the sought individual via a presence server of the presence system. A discovery 48 of a presence state of the associated individual is made via the presence server of the presence system if the sought individual is unavailable. The steps performed in this figure are performed by software, hardware, firmware, and/or the combination of software, hardware, and/or firmware. The transfer of information between the user and the presence system providing such a method occurs via at least one of a wireless protocol, a wired protocol and/or a combination of the wireless protocol and the wired protocol.

Referring now to FIG. 3, a third flow chart of the method of presence driven communication contacts 60 is shown. In the third flow chart, the method comprises searching 62 a relational directory for a sought individual, then scanning 64 the relational directory for an individual associated with the sought individual. A determination 66 is made of a presence state of the sought individual. A discovery 68 of a presence state of the associated individual is made if the sought individual is unavailable. The method includes storing 70 the search results of the sought individual and storing 72 the scan results of the associated individual. The method then comprises displaying 74 the determined presence state of the sought individual and displaying 76 the discovered presence state of the associated individual if the sought individual is unavailable. The method then includes discarding 78 the determined presence state of the sought individual and discarding 80 the discovered presence state of the associated individual if the sought individual is unavailable. The steps performed in this figure are performed by software, hardware, firmware, and/or the combination of software, hardware, and/or firmware. The transfer of information between the user and the presence system providing such a method occurs via at least one of a wireless protocol, a wired protocol and/or a combination of the wireless protocol and the wired protocol.

Referring now to FIG. 4, a first software flow chart of the method of presence driven communication contacts 110 is shown. In the first software flow chart, the computer readable medium (or software) comprises instructions for agglomerating 112 from a relational directory a set of presence states of a sought individual and an individual associated with the sought individual and then prioritizing 114 a display of the agglomerated presence states. The steps performed in this figure are performed by software but may also be performed by hardware, firmware, and/or a combination of software, hardware, and/or firmware. The transfer of information between the user and the presence system providing such a computer readable medium occurs via at least one of a wireless protocol, a wired protocol and/or a combination of the wireless protocol and the wired protocol.

Referring now to FIG. 5, a second software flow chart of the method of presence driven communication contacts 120 is shown. In the second software flow chart, the computer readable medium (or software) comprises searching 122 a relational directory for a sought individual and then scanning 124 the relational directory for and individual associated the sought individual. A determination 126 is made of a presence state of the sought individual. A discovery 128 of a presence state of the associated individual is made if the sought individual is unavailable. The computer readable medium then comprises instructions for agglomerating 130 from a relational directory a set of presence states of the sought individual and the associated individual, linking 132 the agglomerated presence states of the sought individual and the associated individual and prioritizing 134 a display of the agglomerated presence states. The instruction include storing 136 the search results of the sought individual and storing 138 the scan results of associated individual. After the information is used to provide a contact the instructions include discarding 140 the determined presence state of the sought individual and discarding 142 the discovered presence state of the associated individual. The instructions then comprise a request 144 as to whether the user wants to exit the application. The steps performed in this figure are performed by software but may also be performed by hardware, firmware, and/or a combination of software, hardware, and/or firmware. The transfer of information between the user and the presence system providing such a computer readable medium occurs via at least one of a wireless protocol, a wired protocol and/or a combination of the wireless protocol and the wired protocol.

The present invention includes a unique computer readable medium or software that is preferably stored on the presence server. In other embodiments, the software of the present invention can be stored on the presentity, the watcher or a combination of at least two of the presence server, the presentity, and the user, also termed a watcher. Such a computer readable medium comprises instructions for performing the functionality described in relation to FIGS. 1-5.

Figure 6:
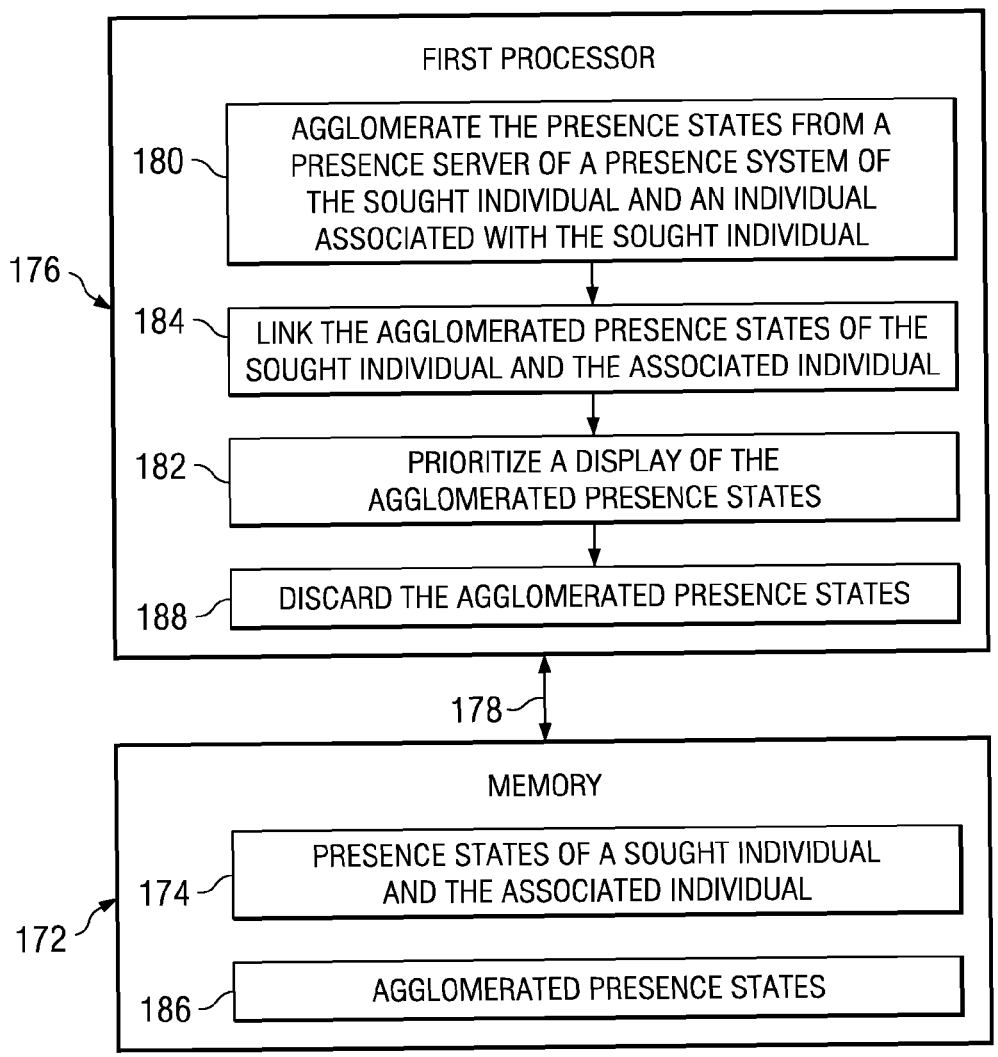
FIG. 6 depicts a system of presence driven communication contacts in accordance with a preferred embodiment of the present invention.

Referring now to FIG. 6, a system of presence driven communication contacts 170 is shown. The system 170 for presence driven communication contacts comprises a memory 172 in which is received from a relational directory a presence state 174 of a sought individual and an individual associated with the sought individual. A processor 176 is communicably coupled 178 to the memory, the processor agglomerates 180 the presence states of the sought individual and the associated individual, prioritize 182 a display of the agglomerated presence states and link 184 the agglomerated presence states of the sought individual and the associated individual. The memory stores 186 the agglomerated presence states and the processor discards 188 the agglomerated presence states. In other embodiments, the system 170 may comprise one processor, more than two processors, and more than one memory without departing from the scope of the present invention.

Figure 7:
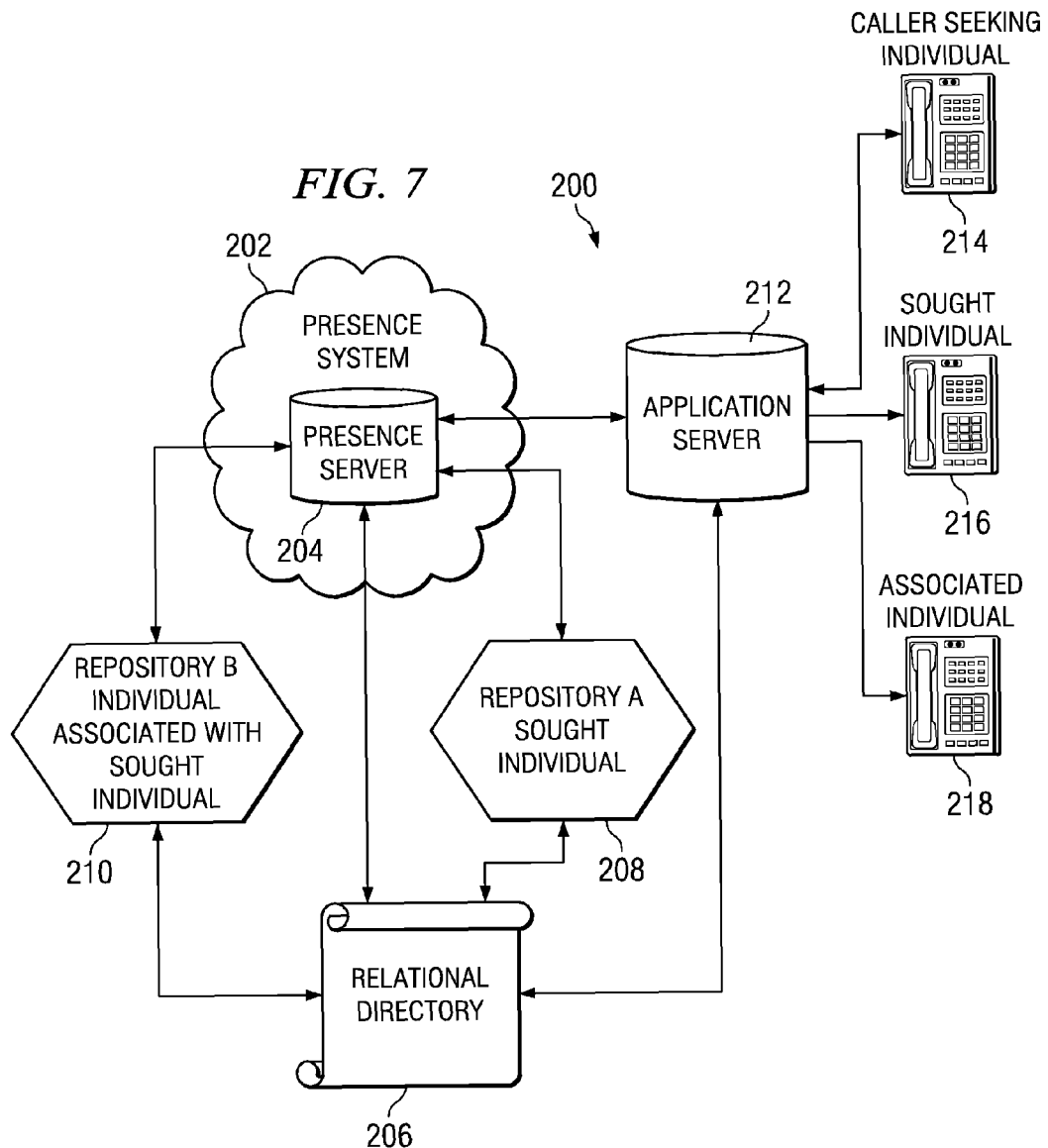
FIG. 7 depicts a system overview of presence driven communication contacts in accordance with a preferred embodiment of the present invention.

Referring now to FIG. 7, a system of presence driven communication contacts 200 is shown. The system 200 for presence driven communication contacts comprises a presence system 202 that has a presence server 204 in which is received from a relational directory 206 a presence state 208 of a sought individual, and a presence state 210 an individual associated with the sought individual. An application server 212 is communicably coupled to the relational directory and the presence server. The application server is communicably coupled to a caller 214, and is communicably coupled to a sought individual 216 and the associated individual 218 to couple the caller to a present entity. In other embodiments, the system 200 may comprise one processor, more than two processors, and more than one memory without departing from the scope of the present invention. The functionality provided by the system is provided by software, hardware, firmware, and/or the combination of software, hardware, and/or firmware. The communications coupling occurs via at least one of a wireless protocol, a wired protocol and/or a combination of the wireless protocol and the wired protocol.

The descriptive verbs searching, scanning, sweeping and surveying the relational directory are meant to be equivalent or substantially equivalent. Additionally the descriptive verbs determining, discovering, detecting and ascertaining the presence state are meant to be equivalent or substantially equivalent. The sought individual and the associated individual may have relationships such as manager, assistant and direct report, colleague, peer, group member, similarly skilled individual, individual performing similar functions, or arbitrarily grouping determined by the individual or system administrator. Examples could be travel agents in a travel department, IT help staff members, etc.

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processor and the processor. Also, these capabilities may be performed in the current manner or in a distributed manner and on, or via, any device able to direct presence messages to targeted watchers. Further, although depicted in a particular manner, various participants or nodes may be repositioned without departing from the scope of the current invention. For example, although described in a particular manner, a greater or lesser number of users, watchers, sought individuals and presence infrastructure could be utilized.

Further, the presence messages or the steps of the present invention (or added messages or steps) may include additional and complementary information in order to accomplish the present invention, to provide additional features to the present invention, and/or to make the present invention more efficient. Still further, the presence messages or the steps of the present invention that are accessed via the presence infrastructure of the present invention may be accessed by a wired phone, a wireless phone, an IP device, or a computer with wired connectivity (such as via a cable modem or Digital Subscriber Line) or wireless capability (such as a wireless modem card or 802.x capability). Other devices may also communicate with the presence infrastructure to originate access and/or provide input to the presence messages or the steps of the present invention.

What is claimed is:

1. A method for presence driven communication contacts, comprising:
    searching a directory for a sought individual's name;
    scanning the directory for a manager of the sought individual's name;
    surveying the directory for a direct report of the sought individual's name;
    determining a presence state via a first input to a network connection through an electronic device to a presence service, the electronic device comprising at least one second processor and a memory in which is received the presence state, of a sought individual associated with the sought individual's name if the sought individual is unavailable;
    discovering a presence state via a second input to the network connection to the presence service to determine presentity of the manager of the sought individual if the sought individual is unavailable; and
    ascertaining via an output, as determined by the first input and the second input to the presence service, a presence state of the direct report of the sought individual if the sought individual is unavailable.

2. The method of claim 1 comprising storing the search results of the sought individual's name.

3. The method of claim 1 comprising storing the scan results of the manager of sought individual's name.

4. The method of claim 1 comprising storing the survey results of the direct report of sought individual's name.

5. The method of claim 1 comprising displaying the determined presence state of the sought individual.

6. The method of claim 1 comprising displaying the discovered presence state of the manager of the sought individual if the sought individual is unavailable.

7. The method of claim 1 comprising displaying the ascertained presence state of the direct report of the sought individual if the sought individual is unavailable.

8. The method of claim 1 comprising discarding the determined presence state of the sought individual.

9. The method of claim 1 comprising discarding the discovered presence state of the manager of the sought individual if the sought individual is unavailable.

10. The method of claim 1 comprising discarding the ascertained presence state of the direct report of the sought individual if the sought individual is unavailable.

11. A system for presence driven communication contacts, comprising:
    a memory adapted to receive, via a network connection to a presentation service, at least one of: a presence state of a sought individual, a presence state of a manager of the sought individual and a presence state of a direct report of the sought individual; and
    a first processor communicably coupled to the memory, the first processor adapted to:
    agglomerate the presence states of the sought individual, the presence state of the manager of the sought individual and the presence state of the direct report of the sought individual;
    prioritize a display of the agglomerated presence states;
    link the agglomerated presence states of the sought individual, the presence state of the manager of the sought individual and the presence state of direct report of the sought individual; and
    store the linked presence states in the memory, wherein the first processer can transmit the presence states of the sought individual from the memory via the network connection to the presentation service.

12. The system of claim 11 further comprising:
    a second processor communicably coupled to the memory, the second processor adapted to display the agglomerated presence states.

13. The system of claim 11 wherein the memory is adapted to store the agglomerated presence states.

14. The system of claim 11 wherein the first processor is adapted to discard the agglomerated presence states.

* * * * *